June 15, 1937.  H. A. ELLIOTT  2,084,193
PRETZEL MAKING MACHINE
Filed May 26, 1934    2 Sheets-Sheet 1
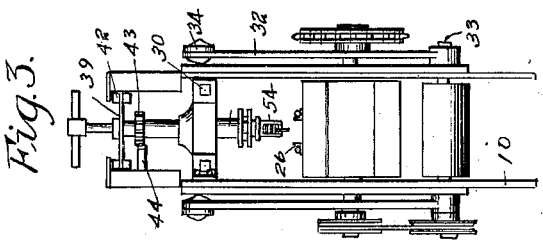
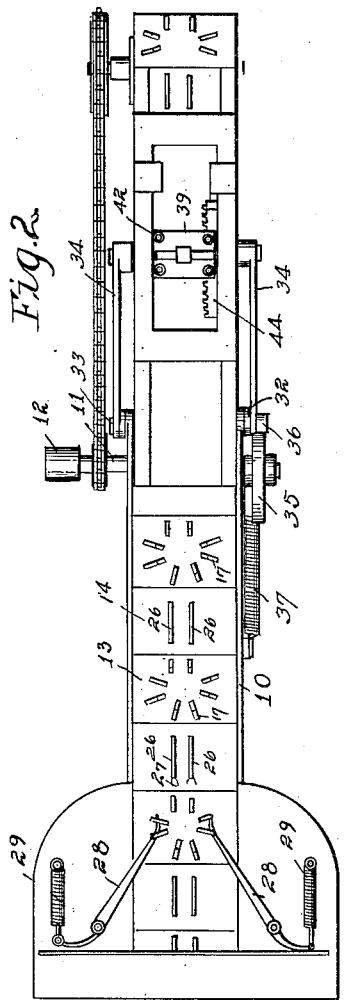
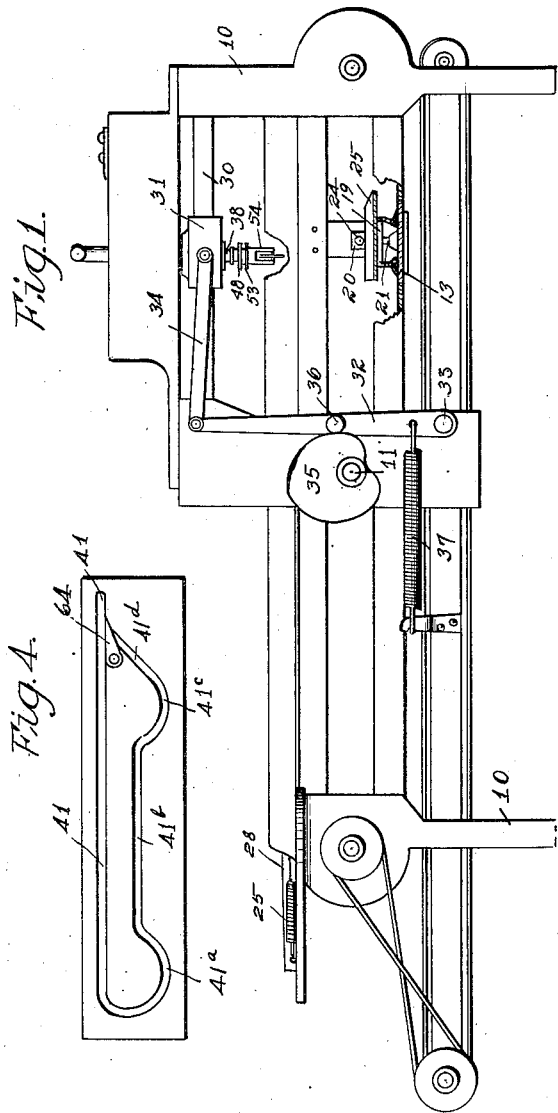
Inventor
Harry A. Elliott June 15, 1937.　　　H. A. ELLIOTT　　　2,084,193
PRETZEL MAKING MACHINE
Filed May 26, 1934　　　2 Sheets-Sheet 2
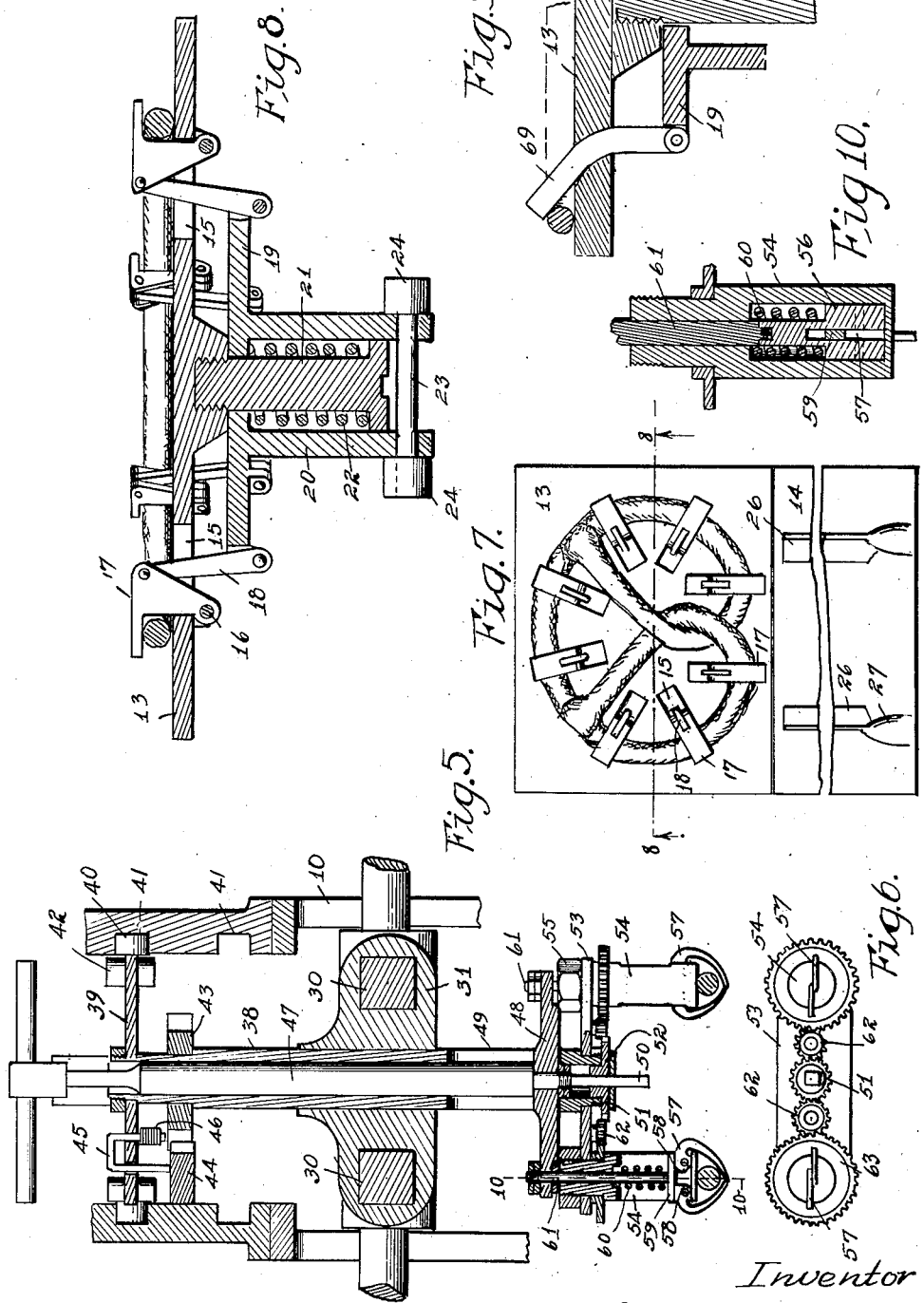

Patented June 15, 1937

2,084,193

UNITED STATES PATENT OFFICE 2,084,193

PRETZEL MAKING MACHINE

Harry A. Elliott, Jefferson, Iowa

Application May 26, 1934, Serial No. 727,702

5 Claims. (Cl. 107—8)

My present invention relates to that class of pretzel making machines illustrated and described in my pending application for United States Letters Patent filed February 5, 1934, Serial Number 709,752, now Patent No. 2,057,772, issued Oct. 20, 1936.

The objects of my present invention are to provide improved means of simple, durable and inexpensive construction for holding the sticks of dough in the general form of a pretzel during the time that the ends of the sticks of dough are being moved toward each other, twisted and pressed into the looped portion of the pretzel, and to provide holders of this class which will automatically withdraw from the completed pretzel without rubbing against or otherwise distorting the finished pretzel.

A further object is to provide simple, durable and inexpensive means for synchronizing the speed of the pretzel being formed with the pretzel holding fingers and pressing plates at the instant when the pretzel end pressing plates are functioning, to thereby prevent said plates from sliding along the pretzel during said pressing movement.

A further object in this connection is to provide improved means for effecting the necessary up and down movement of the presser plates.

A further object is to provide improved means for guiding the movement of the sets of fingers whereby the ends of the sticks of dough, when placed against the formed pretzel loop, are prevented from becoming twisted and also prevented from being bent back over the pretzel, and whereby sticks of dough may be furnished of the proper length for pretzel making, and none of it need be cut off and wasted.

A further object is to provide means of simple, durable and inexpensive construction for delivering the completely formed pretzels from the machine in a right-side-up position ready to be delivered to the oven.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a pretzel making machine embodying my invention.

Figure 2 shows a top or plan view of same.

Figure 3 shows an end elevation of same.

Figure 4 shows an enlarged detail view illustrating the slotted guide device for controlling the up and down movements of the pretzel engaging fingers.

Figure 5 shows an enlarged detail view, partly in vertical section, illustrating the pretzel stick pick-up fingers and pressure plates, and means for supporting and operating same.

Figure 6 shows a bottom view of same.

Figure 7 is a plan view of a pair of pretzel carrying plates and illustrating the pretzel forming and holding devices thereon.

Figure 8 shows a sectional view taken on the line 8—8 of Figure 7.

Figure 9 shows a detail view, partly in section, illustrating a modification of the pretzel forming and holding device.

Figure 10 is a detail sectional view illustrating one of the pick-up finger devices taken on the line 10—10 of Figure 5.

Referring to the accompanying drawings I have used the reference numeral 10 to indicate the machine frame, which may be of any suitable construction. Mounted within the frame is the main shaft 11, with a pulley 12 thereon whereby it may be operated.

Arranged in a horizontal position longitudinally of the machine are the flat metal plates 13 and 14 upon which the pretzels are carried through the machine and formed. These pretzel forming plates are carried by sprocket chains and wheels not shown, but fully illustrated in my said pending application. These pretzel forming and carrying plates are illustrated in detail in Figures 7 and 8, and are arranged in pairs, the plate 13 being the one upon which the looped portion of the pretzel is carried when the pretzel is formed, and the plate 14 receives and holds the end portions of the stick of dough before the pretzel is formed. Plate 13 is formed with a series of slots 15, and extended through each slot and pivotally supported at 16 below the plate 13 is a series of pretzel holding and forming arms 17. These arms extend upwardly through said slots and then outwardly from the center of the plate 13, and they are arranged around the plate 13 in the general form of a pretzel loop.

Connected to each of the arms 17 is a link 18 which extends downwardly through the slot 15. These links 18 are all pivoted to a sliding plate 19. This sliding plate 19 has a downwardly extending cylindrical portion 20 which is connected to the plate 19 by means of a bolt 21, and a spring 22 is mounted between the bolt 21 and the interior of the cylindrical portion 20 for normally holding the plate 19 upwardly in such position that the arms 17 extend upwardly and substantially horizontally outwardly from the center of the plate 13.

For moving the plate 19 downwardly when it is desired to release the formed pretzel loop I have provided a shaft 23 with rollers 24 at its ends. These rollers are designed to engage a guide device 25 fixed in position in the frame as shown in Figure 1, and said guide device is so inclined that at the proper moment for releasing the formed pretzel, the rollers 24 will engage it and move the plate 19 downwardly against the pressure of the spring 22, thereby causing the links 18 to move the arms 17 inwardly toward the center of the plate 13, and downwardly so that the upper ends of the arms 17 move downwardly through the slots 15 and away from the formed pretzel loop.

I have described the construction of the plate 13 and the pretzel forming and holding arms 17 as same is illustrated in Figure 8. In the operation of the machine the pretzel is formed with the plate 13 and said arms 17 in the position shown in Figure 8, but when the arms 17 are released to permit the pretzel to drop off, then the plate 13 is in an inverted position on the under side of the sprocket chains, as illustrated in Figure 1. With this improved construction the pretzel holding and forming arms 17 are bodily moved away from the looped portion of the pretzel in such a manner that they will not rub upon or otherwise disfigure the pretzel either when being formed or when being released.

On the plate 14 there are two upright ribs 26 arranged longitudinally and designed to limit the inward movement of the ends of the stick of dough, and formed in the plate 14 near its end farthest from the plate 13 are two concave grooves 27 to receive the ends of the stick of dough and to provide means for causing the pick-up fingers to move toward each other under the end portions of the stick of dough for gripping the stick of dough.

The sticks of dough are fed to the machine in the form of a straight stick arranged transversely of the plate 13 and the forward ones of the arms 17 engage the central portion of the stick of dough, then as the plate 13 advances, the end portions of the stick of dough are engaged by the pivoted arms 28 which are yieldingly held by the spring 29 with their free ends toward each other, as illustrated in Figure 2. These pivoted arms 28 function to press the end portions of the stick of dough against the ribs 26, on the plate 14, so that the stick of dough then assumes a substantially U shape.

For picking up the ends of the dough sticks and twisting them together and pressing the ends into bonding engagement with the looped portion of the pretzel, I have provided the following improved mechanism.

Mounted within the machine frame above the plates 13 and 14 are two longitudinally arranged guide rods 30, and slidably mounted upon these guide rods is a crosshead 31 which carries the pick-up fingers. This crosshead is moved longitudinally on the machine and back by means of the levers 32 fixed at their lower ends to the shaft 33, so that they operate in unison, and extend upward where they are pivoted to the links 34, which are also pivoted to the ends of the crosshead 31.

For guiding the levers 32 at the proper time and speed I have fixed to the main drive shaft 11 a cam 35 which engages a roller 36 and one of the levers 32. A spring 37 is provided for holding the roller 36 against the periphery of the cam 35. This cam is so shaped that it will travel relative to the constant speed of the plates 13 and 14 so that when the ends of the stick of dough are picked up the crosshead 31 will move faster than the plates 13 and 14 and bring the ends of the stick of dough to position over the looped portion of the pretzel, and then at the instant when the ends of the stick of dough are being pressed into the looped portion of the pretzel, the crosshead 31 moves exactly at the same speed as that of the plates 13 and 14 so that at this period there is no sliding movement of the pressure plates relative to the pretzel. Then, immediately after the pressing operation the crosshead 31 is quickly returned to starting position.

By this arrangement I have demonstrated, in a full size working machine of this class, that the stick of dough may be accurately formed in the conventional shape of a pretzel without applying strains and stresses to various parts of the stick of dough and without rubbing or scraping the ends of the stick of dough when they are being bonded to the looped portion of the pretzel, so that the completed pretzel becomes an exact facsimile of the ordinary hand-made commercial pretzel.

The construction of the pretzel stick engaging fingers and twisting and releasing mechanism is as follows:

Mounted within the crosshead 31 is a hollow shaft 38 slidingly and rotatably mounted in the crosshead 31. Mounted on the upper end of the hollow shaft 38 is a carriage 39 having rollers 40 at its ends which enter slots 41 formed in the machine frame. This carriage is guided in its movement and held in position extended transversely of the machine by means of rollers 42 on its upper and lower surface, to engage the adjacent portion of the frame of the machine near the slots 41.

For causing the hollow shaft 38 to rotate at the proper time for performing the twisting operation I have provided a pinion 43 fixed to the upper portion of the hollow shaft 38 and designed to engage with a stationary rack bar 44 fixed to the machine frame in the position illustrated in Figure 2, and when this pinion 43 is in mesh with the rack bar 44, the hollow shaft 38 is given one complete revolution, as required for twisting the stick of dough.

It is necessary to hold the shaft 38 against rotation at all times other than when the pinion 43 is in engagement with the rack bar 44, and for this purpose I have provided a substantially U shaped latch device 45 which has one arm arranged to engage the rack bar 44, the end of the rack bar 44 being slightly bevelled to lift the latch device 45 and hold it up while the latch device travels over the rack bar. The other end of the latch device is designed to move downwardly between the teeth of the pinion 43, and a spring 46 is provided for yieldingly holding the latch device downwardly, then when the latch device passes beyond the rack bar the spring 46 moves the latch device downwardly between the teeth of the pinion 43, thereby locking the hollow shaft 38 against further rotary movement during the rest of its travel.

Mounted within the hollow shaft 38 is a shaft 47. Rotatably mounted on the lower end of the shaft 47 is a bar 48. The lower end of the hollow shaft 38 is formed with slots 49 on opposite sides in which the bar 48 is slidingly supported for up and down movement. The lower end of the shaft 47 which extends below the bar 48 is square, as shown at 50, and passes through a pinion 51 having a square opening to receive it. This pinion 51 has an upwardly extending hub which enters the lower end of the hollow shaft 38 and is rotatable therein, and this pinion 51 is held in place by a bracket 52 carried by the hollow shaft 38.

Below the bar 48 is a second bar 53 which is rotatably mounted in the lower end of the hollow shaft 38, and this bar 53 forms a support for the pick-up finger device, as will hereinafter appear.

The pick-up finger devices, of which there are two, each comprises a body portion 54 which extends upwardly through the bar 53, to which it is fixed in position by the nut 55. The body 54 is provided with a transverse opening as shown in Figure 10, and extended through this opening is a pick-up finger carrier 56. This pick-up finger carrier is slotted, and the pick-up fingers 57 are pivotally mounted in said slot. These pick-up fingers are curved downwardly and toward each other, and at their upper ends they are provided with a cam shaped surface at 58. These cam shaped surfaces 58 are engaged by a bar 59. This bar extends through the slot in the carrier 56, and is yieldably held downwardly by a spring 60, so that with this construction the pick-up finger is normally held by the spring 60 and the cam 58 in position spaced apart from each other.

For moving the carrier 56 and the pick-up fingers 57 vertically relative to the body 54 I have provided a shaft 61 rotatably mounted in the bar 48 and extended downwardly through the center of the body 54. This lower end is detachably screwed into the upper end of the carrier 56.

For rotating the body 54 I have provided pinions 62 carried by the bar 53 and in mash with the pinion 51, and fixed to the body 54 is another pinion 63. By this arrangement it will be seen that when the shaft 38 is rotated, the pinion 51 will remain stationary. Then, when the bar 53 is rotated the pinions 62 will rotate the pinions 63 both in the same direction, and the bodies 54, to which the pinions 63 are fixed, will both rotate in the same direction. In this connection it will be noted that the pinions 63 are approximately twice the diameter of the pinion 51, so that when the bar 53 makes a complete revolution, as required for twisting the dough stick together, the bodies 54 will be rotated approximately half a revolution for the purpose hereinafter made clear.

The lower end of the body 54 is substantially flat and substantially circular in outline, and functions as a presser plate, and this presser plate operates to press an end of the dough stick into bonding engagement with the looped portion of the pretzel, and when this body 54 is functioning as a presser the pick-up fingers are at their upward limit of movement wholly above the bottom of the body 54.

In practical operation of this part of my machine I have demonstrated in practice that when one of the plates 14, with its grooves 27, is in the proper position during its movement, then the pick-up finger device with the pick-up fingers held wide open by the spring 60 is moved down to position against the plate 14, the lower ends of the pick-up fingers are guided by said rounded groove 27, so that they move together and surround the end portions of the stick of dough. Then, the pick-up finger device is bodily moved upwardly a slight distance, as hereinafter described, and then forwardly along the same line of travel as the plate 14 is moved, but at a greater rate of speed, so that the ends of the stick of dough are carried forwardly over the plate 13, and at the same time the pick-up finger device is caused to rotate one complete revolution, thus twisting together the stick of dough between the looped portion and the end portions thereof. While this twisting movement is progressing the pinions 51, 62 and 63 will function to give a half turn to the end portion of the stick of dough, thus causing the end portions of the stick of dough to extend straight outwardly over the looped portion of the pretzel and at the same time give a half turn untwisting movement to the end portions of the stick of dough, beyond the twisted portion, so that the completed pretzel has the ends of the stick of dough extended straight over the looped portion of the pretzel and substantially flush with the outer surface of the looped portion, so that none of the stick of dough need be cut off. At the instant when the end portions of the stick of dough are immediately over the looped portion of the pretzel, then the bodies 57 move downwardly relative to the carrier 56, thus bringing the lower ends of the bodies 54 into pressing engagement with the ends of the stick of dough, and at the same time causing the pick-up fingers to retain their elevated position and be wholly out of the way when this pressing operation is in progress.

The means for guiding the stick of dough pick-up and twisting devices through their operation comprises a groove 41, heretofore described, in the frame 10, and rollers 40 on the carriage 39 of the pick-up device, which rollers travel in the grooves 41. The shape of this groove 41 is illustrated in detail in Figure 4. Its upper portion is substantially straight and horizontally arranged, and at the left end of the groove inclines downwardly at 41a, and then upwardly, and again horizontally at 41b, and again downwardly at 41c, and thence inclined upwardly at 41d to a point spaced apart from the end 41e of the upper portion of the groove. At the intersection of the parts 41d and 41e there is a pivoted switch 63. These parts are so arranged that, when the carriage 39 is being moved rearwardly the rollers 40 will travel in the straight upper portion of the groove, then at the instant when the pick-up fingers are in position to engage the ends of the stick of dough the rollers 40 move downwardly into the part 41a of the groove, and then as soon as the fingers have picked up the stick of dough the carriage moves upwardly and travels horizontally in the part 41d of the groove, and it is during this time that the pretzel stick is being twisted over the looped portion of the pretzel. Then when this twisting has been completed and the ends of the stick of dough are in position over the looped portion, the carriage 39 again moves downwardly in the part 41c of the groove, and at this time the ends of the stick of dough are pressed into bonding engagement with the looped portion of the pretzel, and as soon as this is accomplished the rollers 40 travel upwardly in the part 41d of the groove and past the switch 64 into the part 41e of the groove, and then the switch 64 automatically lowers by gravity, so that when the return movement of the rollers 40 commences, the switch will direct the rollers into the upper horizontal part of the groove.

When the completed pretzels are discharged from the plates 13 and 14 they will drop downwardly in an upside down position. For the purpose of delivering these completed pretzels in a right-side-up condition to be placed in pans or other receptacles for baking, I have provided a simple and inexpensive construction which performs this function automatically and without injuring or distorting the pretzels. This pretzel inverting and conveying device comprises a canvas conveyor 65, arranged substantially horizontally just below the point where the pretzels are dropped from the plates 13 and 14, and the conveyor is so connected by belt 66 and pulleys 67 and 68 as to cause the upper portion of the canvas conveyor to run in the same direction as the plates 13 and 14 are moving when the pretzel is dropped from them.

I have discovered in practice that when these pretzels, in the form of dough sticks properly shaped, are deposited upon the canvas belt, then ceptacle placed a short distance below this delivery end of the canvas belt they will, due to the somewhat sticky nature of the dough, adhere to the canvas belt at the point where the belt is traveling downwardly, to an amount just sufficient to prevent them from slipping off of the belt during the turning over movement, then after the pretzel is partially turned over its momentum, together with the action of gravity, will cause the pretzel to turn completely over to a right-side-up position when it reaches the pan or other receptacle placed a short distance below this delivery point. Except for this slight adhesion between the dough and conveyor the pretzel would slide off of the downwardly traveling part of the conveyor and be deposited on its edge and thus become distorted. This action is entirely automatic, and in practice I have found that with this construction the completed pretzels are delivered in right-side-up condition without distortion.

In Figure 9 I have illustrated a modified form of means for holding the looped portion of the pretzel during the forming operation and in releasing it when the pretzel has been completed and the pretzel carrying plates 13 and 14 have been moved to an inverted position. This means comprises a series of rods 69 made of flexible material, such as rubber, coiled wire or the like. These rods are the same in number and the same in position as the arms 17 of my preferred form. Their lower ends are connected to the plate 19, and their body portions are extended through grooved passageways in the part 13. When the member 19 is elevated relative to the member 13, then the ends of these holders 69 project out over the looped portion of the pretzel and hold it against upward movement during the twisting operation, and against downward movement when the plate 13 is inverted. Then, at the instant when it is desired to release the pretzel, the member 19 is moved away from the plate 13 and the holders 69 are withdrawn into the passageway in the plate 13 so that the pretzel may be dropped by gravity. This modified form has the advantage of being simple and inexpensive.

I have heretofore described the construction and mode of operation of each of the separate elements of my improved machine, and I will now briefly describe the operation of the machine as a whole. While the machine is in operation the pretzel supporting and forming plates 13 and 14, of which there may be any desired number, continuously move at uniform speed. The sticks of dough are fed to the machine in straight form of exactly the right length for forming a pretzel and the central portion of each stick is engaged by the pretzel holding and forming fingers, and this central portion is moved forwardly into a substantially U-shaped position, the ends of the pretzel stick being folded into that position by means of the pivoted arms 28. When the machine has advanced a short distance the pick-up fingers engage the end portion of the stick of dough, then they elevate these end portions and move them forwadly over the looped portion at a speed somewhat greater than that of the speed of the plates 13 and 14, and during this movement the pairs of pick-up fingers rotate one complete revolution about each other, thus forming the twist in the stick of dough. At the same time that the twist is being formed in the pretzel, each pair of pick-up fingers is independently rotated approximately one-half revolution upon its own axis, in the direction required for holding against torsional twisting, those portions of the stick of dough between the twisted part of the prezel and the ends, and at the same time this half revolution of the pick-up fingers causes the ends of the stick of dough to project forwardly over the looped portion of the pretzel instead of being doubled backwardly over itself as would be the case if these pick-up fingers were not thus rotated a half revolution after the twisting operation. The result is that the pretzel as completed has a twist only in its central portion, and the ends are straight and untwisted, and are placed in the proper position over the looped portion of the pretzel, and immediately thereafter the presser plates are moved downwardly and the pick-up fingers released from the pretzel, thus pressing the ends of the stick of dough into bonding contact with the looped portion of the pretzel. As soon as this operation is completed the assembly containing the pick-up fingers is rapidly moved rearwardly relative to the line of advance of the plates 13 and 14 and engages and picks up a second pretzel stick on the succeeding set of plates 13 and 14. After the pretzel has been completed the plates 13 and 14 move downwardly over the end of the conveyor, to an inverted position, and when in that position the pretzel engaging and forming fingers are automatically withdrawn so that the completed pretzel falls by gravity upon the canvas belt and in an inverted position.

In practice I have found that this pretzel forming and releasing mechanism does not in any way distort the completed pretzel, and it is delivered upon the canvas belt in substantially an exact facsimile of the present day hand made pretzels. Then, in order to invert the pretzels and place them in a right-side-up condition ready for baking, I have employed a canvas belt device, as before described, which receives the pretzels from the plates 13 and 14 and carries them to the delivery end of the machine and inverts them and delivers them to receptacles for baking, and this is also done in such a manner that the pretzels, when dropped from the canvas belt, are in perfectly inverted positions and drop into the pan or other receptacle in flat, horizontal positions, so that they are not distorted during this dropping movement.

I claim as my invention:

1. In a pretzel making machine, the combination of an endless conveyor, a plate carried by the conveyor shaped to receive and support a stick of dough while being formed into the shape of a pretzel, forming devices projected outwardly from said plate to engage the sides of a stick of dough for holding the stick of dough into a looped position while the pretzel is being formed, said pretzel forming devices being formed with fingers to project over the outer surface of the looped portion of the stick of dough to hold it against the plate, and means for bodily withdrawing said pretzel forming devices and fingers from contact with the stick of dough and withdrawing said fingers to position where they will not interfere with a movement of the pretzel away from the outer surface of the plate.

2. In a pretzel making machine, the combination of a movable carriage, a shaft carried thereby, a pick up device on said shaft, means for rotating the shaft during a limited portion of its travel to impart a rotary movement to said pick up device, and means for automatically locking said shaft against rotation during the remainder of its travel, said means for rotating the shaft comprising a pinion fixed to the shaft and a stationary rack in the path of travel of the pinion, and said locking means comprising a latch device mounted on the carriage normally in position in locking engagement with the pinion, and a stationary guide device in the path of travel of said latch to release the latch at the time the pinion is in engagement with the rack.

3. In a pretzel making machine, the combination of a member for supporting a stick of dough while being formed into the shape of a pretzel, means for forming a stick of dough into substantially a U shaped body, a carriage mounted to move relative to the supporting member, means carried by the carriage member for grasping the ends of said U shaped body, rotating means for moving said grasping means about a common center of rotation to twist one leg of said U shaped body about the other, means for rotating said grasping means in the same direction and relative to the rotating means, and in the opposite direction of said rotating means, and means for bonding the ends of said stick into the looped portion of said pretzel after the twisting operation has taken place.

4. In a pretzel making machine a conveyor shaped to receive and support pretzels during their formation, means for advancing said conveyor at a pre-determined rate of speed, a pretzel twisting mechanism comprising means for engaging the ends of a pretzel stick, means for twisting said pretzel stick, means for advancing said pretzel twisting mechanism over said supporting conveyor in the same direction as the conveyor is moving and at a rate of speed faster than that of the conveyor, means for pressing the ends of said pretzel stick downwardly toward the conveyor, and means for synchronizing the movements of the pretzel twisting mechanism and the conveyor at the instant when said means for pressing the ends of the pretzel stick downwardly have operated.

5. In a pretzel making machine a conveyor shaped to receive and support pretzels during their formation, means for advancing said conveyor at a pre-determined rate of speed, a pretzel twisting mechanism comprising means for engaging the ends of a pretzel stick, means for twisting said pretzel stick, means for advancing said pretzel twisting mechanism over said supporting conveyor in the same direction as the conveyor is moving and at a rate of speed faster than that of the conveyor, means for pressing the ends of said pretzel stick downwardly toward the conveyor, means for synchronizing the movements of the pretzel twisting mechanism and the conveyor at the instant when said means for pressing the ends of the pretzel stick downwardly have operated, and automatic means for speeding the movement of said twisting mechanism above that of the conveyor after said downward movement has been completed.

HARRY A. ELLIOTT.